UNITED STATES PATENT OFFICE.

FRANK A. CIGOL, OF PATERSON, NEW JERSEY.

RESILIENT BALL.

1,077,121. Specification of Letters Patent. Patented Oct. 28, 1913.

No Drawing. Application filed November 16, 1911. Serial No. 660,716.

*To all whom it may concern:*

Be it known that I, FRANK A. CIGOL, a citizen of the United States, residing at Paterson, in the county of Passaic and State of New Jersey, have invented a new and useful Improvement in Resilient Balls, of which the following is a specification.

The present invention relates to improvements in balls, the primary object of the invention being the provision of a homogeneous ball, composed of materials that render the same of a less specific gravity than water, permitting the ball to be used especially as a baseball and surf ball, the peculiar combination of ingredients in its composition producing an integral seamless cover or outer surface rendering the same less liable to injure the hands of the player.

A further object of the present invention is the provision of a ball, composed of ingredients that impart to the ball the desired rebound or elasticity and specific gravity for use as a base ball and surf ball, the composition being water proof and non-sinkable, and having a smooth seamless exterior.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

The ball is molded in the usual manner being vulcanized and is composed of the following ingredients; viz:—rubber, a rubber substitute, ground cork, a fiber, such as wool fiber, felt fiber, cotton fiber, hemp fiber, jute fiber or the like, sulfur, and carbonate of ammonia, or carbonate or bi-carbonate of soda.

The preferred proportions of the above ingredients are as follows:

| | | |
|---|---|---|
| Rubber | 32½ | parts, in weight. |
| Rubber substitute | 30 | " " " |
| Ground cork | 25 | " " " |
| Fiber | 5 | " " " |
| Sulfur | 5 | " " " |
| Carbonate of ammonia | 2½ | " " " |
| Total | 100 | " " " |

The rubber substitute is composed of any of the vegetable oils vulcanized by boiling with sulfur or chlorid of sulfur, or by mixing therewith any hydro-carbon of the tar specie, generally used at the present time in compounding rubber after having been purified.

The above ingredients are heated and mixed in a semi-liquid state and then poured into molds to produce balls of the desired size, the same being vulcanized so as to produce a hardened outer surface. This hardened outer surface is then coated with a white enamel and to imitate seams thereupon, a stenciling operation is resorted to, so that the completed ball will present the appearance of a white leather covered sewn ball, but without the undesirable seams.

During the vulcanizing process, the ammonium carbonate or the sodium carbonate or bi-carbonate is driven off, producing small cells, or interstices, in the mass, thus adding elasticity and softness to the ball, and reducing the weight of the ball at least three per cent. The cork and fiber displace the rubber and rubber substitute generally used in balls of this character to such a marked degree as to reduce the weight or specific gravity of the ball and render the same non-sinkable, while the rubber renders the same water proof. By reason of this fact the rubber imparting the desired water proofing effect, the ball is especially desirable for use as a base ball or surf ball.

The ammonium carbonate, or its equivalent, may be dispensed with if so desired, this ingredient, however, demonstrating that the article completed and after vulcanizing will lose about three per cent. of its weight but gain in elasticity and softness, this gain being caused by the diffusion of the ammonium carbonate or its equivalent and leaving cells or interstices in the mass.

What is claimed is:—

1. A composition ball composed of rubber and a rubber substitute in substantially equal proportions, and weight-reducing materials combined therewith in such proportions as to reduce the specific gravity of the product to less than that of water, the said materials being respectively of granular and fibrous form, the whole being vulcanized and provided with an enameled exterior coating.

2. A composition ball composed of rubber and a rubber substitute in substantially equal proportions, and cork combined therewith in such proportions as to reduce the specific gravity of the product to less than that of water, the whole being vulcanized and provided with an enameled exterior coating.

In testimony that I claim the foregoing as my own, I have hereto affixed my signature in the presence of two witnesses.

FRANK A. CIGOL.

Witnesses:
ELIDA ZELIFF,
GORDON BROWN.